(12) United States Patent
Papenfuhs et al.

(10) Patent No.: US 7,528,192 B2
(45) Date of Patent: May 5, 2009

(54) CROSSLINKED POLYVINYL ACETALS

(75) Inventors: Bernd Papenfuhs, Obertshausen (DE); Martin Steuer, Liederbach (DE); Matthias Gutweiler, Huenfelden (DE)

(73) Assignee: Kuraray Europe GmbH, Frankfurt (DE)

( * ) Notice: Subject to any disclaimer, the term of this patent is extended or adjusted under 35 U.S.C. 154(b) by 677 days.

(21) Appl. No.: 10/542,022

(22) PCT Filed: Dec. 12, 2003

(86) PCT No.: PCT/EP03/14110

§ 371 (c)(1),
(2), (4) Date: Dec. 30, 2005

(87) PCT Pub. No.: WO2004/063232

PCT Pub. Date: Jul. 29, 2004

(65) Prior Publication Data

US 2006/0205871 A1 Sep. 14, 2006

(30) Foreign Application Priority Data

Jan. 9, 2003 (DE) .................... 103 00 320
Apr. 29, 2003 (DE) .................... 103 19 199

(51) Int. Cl.
*C08F 8/00* (2006.01)
(52) U.S. Cl. ............................... 525/61; 525/56; 526/62
(58) Field of Classification Search .................. 525/56, 525/61; 526/62, 61
See application file for complete search history.

(56) References Cited

U.S. PATENT DOCUMENTS

| 2,332,899 | A | 10/1943 | D'Alelio |
| 4,814,529 | A | 3/1989 | Cartier et al. |
| 5,332,774 | A | 7/1994 | Klang |
| 6,265,509 | B1 * | 7/2001 | Muller ............... 526/266 |
| 6,808,858 | B2 * | 10/2004 | Fuss et al. ............... 430/157 |
| 2002/0040078 | A1 | 4/2002 | Kayser et al. |

FOREIGN PATENT DOCUMENTS

| EP | 0211818 | 2/1987 |
| EP | 1180529 | 2/2002 |

* cited by examiner

*Primary Examiner*—Randy Gulakowski
*Assistant Examiner*—Michael M Bernshteyn
(74) *Attorney, Agent, or Firm*—Millen, White, Zelano, Branigan, P.C.

(57) ABSTRACT

The invention relates to a method for producing crosslinked polyvinyl acetals, according to which a vinyl alcohol copolymer is reacted with at least one polyaldehyde and is partly esterified.

17 Claims, No Drawings

CROSSLINKED POLYVINYL ACETALS

This invention relates to cross-linked polyvinyl acetals, process for their production as well as their use, in particular for laminated safety glasses.

The modification of polyvinyl alcohol by means of acetalization, in particular with n-butyraldehyde, is a reaction that has been known and used for a long time. Films of polyvinyl acetals that are obtained in this way, in particular polyvinyl butyrals, are used as intermediate layers in laminated safety glasses, in particular in automobile windshields (front and rear windshields) because of their high light diffraction as well as their very good aftertack. Such laminated glasses offer a large degree of safety, since in the case of an impact stress, the elastic polyvinyl acetal film absorbs the mechanical energy and the glass fragments that are possibly produced continue to adhere to the film.

Unfortunately, however, laminated safety glasses based on conventional polyvinyl acetal types often have only inadequate mechanical properties, in particular at elevated temperatures of more than 150° C. This problem is also very difficult to solve by using polyvinyl acetals with higher molecular weights, since at this point, i.e., because of processing problems (e.g., bubble formation, excessive or overly low viscosity of the polyvinyl acetal in the case of the processing temperature, deficient constancy of the properties during processing), in most cases it pushes the limits of practical feasibility.

For this reason, European Patent Application EP 0 211 818 A1 proposes using polyvinyl butyrals, which with use of aldehydes were cross-linked with at least two aldehyde groups via intermolecular diacetal linkages before or during the acetalization reaction of the polyvinyl alcohol with butyraldehyde. Because of the very high reactivity of aldehydes, however, this type of cross-linking results in strongly cross-linked, very high-molecular and therefore partially insoluble polyvinyl butyrals, which are suitable only to a limited extent—if at all—for the production of high-quality laminated safety glasses. Apart from this, the polyvinyl butyrals that are cross-linked by di- or polyaldehydes are not sufficiently stable under the conditions of the thermoplastic processing of the polymer (e.g., extrusion), and thus based on the temperatures, dwell times, shear rates, etc. that are used, a more or less greatly pronounced cleavage of the cross-linking sites (molecular weight degradation) is carried out. This deficiency in thermal stability in particular hampers the production of reproducible product qualities, since the polymer reacts with extreme sensitivity to process fluctuations and in addition results in a deterioration of the mechanical properties of polyvinyl acetals, in particular at elevated temperatures.

In view of this prior art, it was therefore an object of this invention to provide polyvinyl acetals with improved mechanical properties, in particular at elevated temperatures, preferably higher than 150° C. In this case, the polyvinyl acetals according to the invention should be suitable in particular for the production of films as well as in particular for the production of high-quality laminated safety glasses, and for this reason preferably exhibit an improved constancy of material properties, in particular the mechanical properties, during processing into films and into laminated safety glasses.

In addition, the object of this invention was to indicate a process for the production of the polyvinyl acetals according to the invention, which can be performed simply, on an industrial scale, and economically.

Another object of this invention was also to be the showcasing of especially suitable applications of polyvinyl acetals according to the invention.

This object as well as other objects that are not mentioned explicitly, which, however, are not easily deducible or inferable from the relationships discussed herein, are achieved by cross-linked polyvinyl acetals, which can be obtained by a production process with all features of this claim 1. Suitable modifications of the process according to the invention are put under protection in the subclaims that refer back to claim 1. In addition, the polyvinyl acetals that can be obtained by the process according to the invention as well as especially advantageous forms of administration and fields of application for practical use are claimed.

Since a process for the production of cross-linked polyvinyl acetals is prepared in which a polymer (A1) is cross-linked, which, relative to its total weight, contains a) 1.0 to 99.9% by weight of structural units of formula (1)

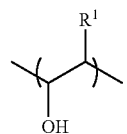

(1)

in which $R^1$ means hydrogen or methyl, b) 0 to 99.0% by weight of structural units of formula (2)

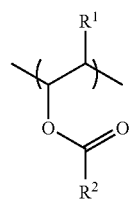

(2)

in which $R^2$ represents hydrogen or an alkyl radical with 1 to 6 carbon atoms, c) 0 to 70.0% by weight of structural units of formula (3)

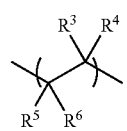

(3)

in which $R^3$, $R^4$, $R^5$ and $R^6$, in each case independently of one another, are radicals with a molecular weight in the range of 1 to 500 g/mol, d) 0.00001 to 30.0% by weight of structural units of formula (4)

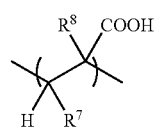

(4)

in which $R^7$ and $R^8$, in each case independently of one another, contain hydrogen, a carboxyl group, an alkyl group with 1 to 10 carbon atoms, which optionally can exhibit one or more COOH groups as substituents, or represents an optionally substituted aryl group with 6 to 12 carbon atoms, whereby in any sequence (i) polymer (A1) is reacted with at least one polyaldehyde of formula (5),

in which $R^9$ represents a bond or a radical that has 1 to 40 carbon atoms, and n is an integer that is greater than or equal to 2, and (ii) groups of formula (1) and formula (4) are at least partially esterified with one another, it is possible, in a way that is not easily predictable, to make accessible cross-linked polyvinyl acetals, which have improved mechanical properties, primarily a higher storage module, especially at elevated temperatures, preferably of more than 150° C.

At the same time, the cross-linked polyvinyl acetals according to the invention exhibit a number of other advantages. These include, i.e.:

The polyvinyl acetals according to the invention are distinguished by an improved constancy of their material properties, in particular their mechanical properties, such as, for example, their storage module. This advantage is observed in particular at elevated temperatures, especially of more than 150° C. A change in the cross-linking density as in EP 0 211 818 A1 cannot be observed within the scope of this invention, by contrast, the polyvinyl acetals according to the invention exhibit a clearly improved constancy of their cross-linking density even at elevated temperatures, especially of more than 150° C.

The presence of the polymer-bonded carboxyl or carboxylate groups in the polymers according to the invention results in a significant stabilization of the joints that are developed over acetal bridges. In addition, they fulfill a buffer function and in this way effectively counteract possibly harmful acid effects, for example by hydrolysis products of antiblocking agents.

The cross-linked polyvinyl acetals according to the invention can be obtained simply, on an industrial scale, and economically. In this case, oxidation reactions and/or other thermally induced secondary reactions, which generally result in a discoloration of the polymer and thus would mean a loss of quality especially for use as (transparent) laminated safety glasses, are avoided especially by the gentle cross-linking conditions and the short cross-linking times that are necessary for this purpose.

The production of the cross-linked polyvinyl acetals according to the invention can be carried out very quickly and gently, so that very short extrusion lines or the extruder dwell times can be selected based on the molecular weights of the polyvinyl acetals that are already high at the beginning.

Because of its characteristic property profile, the polyvinyl acetals according to the invention are especially suitable for laminated safety glasses, which can be produced simply, on an industrial scale, and economically, in particular by an extrusion process. In this case, primarily the advantage—that by the use of the polyvinyl acetals according to the invention both a bubble formation and property fluctuations during the processing are avoided to a very great extent —makes itself felt in this connection, and in this way, laminated safety glasses with improved optical and mechanical properties with high reproducibility are available.

The polyvinyl acetyls according to the invention can be obtained starting from a polymer (A1), which, relative to its total weight, contains a.) 1.0 to 99.9% by weight of the structural units of formula (1)

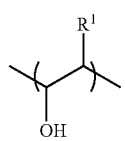

b.) 0 to 99.0% by weight of the structural units of formula (2)

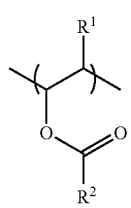

c.) 0 to 70.0% by weight of the structural units of formula (3)

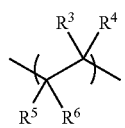

d.) 0.00001 to 30.0% by weight, preferably 0.1 to 30.0% by weight, of the structural units of formula (4)

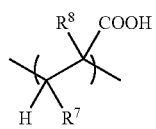

In this case, the respective structural units are naturally different from one another; in particular the structural unit of formula (3), within the scope of this invention, does not comprise the structural units of formulas (1), (2) and/or (4).

In each case independently of one another, radical $R^1$ represents hydrogen or methyl, preferably hydrogen.

Radical $R^2$ identifies hydrogen or an alkyl radical with 1 to 6 carbon atoms, preferably an alkyl radical with 1 to 6 carbon atoms, suitably a methyl, ethyl, n-propyl, iso-propyl, n-butyl, sec-butyl, tert-butyl, n-pentyl or an n-hexyl group, advantageously a methyl group or an ethyl group, in particular a methyl group.

In each case independently of one another, radicals $R^3$, $R^4$, $R^5$ and $R^6$ are radicals with a molecular weight in the range of 1 to 500 g/mol, suitably hydrogen, an optionally branched, aliphatic or cycloaliphatic radical with 1 to 16 carbon atoms, which optionally can contain one or more carboxylic acid amide groups and/or sulfonic acid groups.

Radical $R^7$ is hydrogen, a carboxyl group (COOH), an alkyl group with 1 to 10 carbon atoms, which optionally can have one or more COOH groups as a substituent, or an optionally substituted aryl group with 6 to 12 carbon atoms, suitably hydrogen or a methyl, ethyl, n-propyl, iso-propyl, n-butyl, sec-butyl, tert-butyl, n-pentyl or an n-hexyl group.

Radical $R^8$ refers to hydrogen, a carboxyl group, an alkyl group with 1 to 10 carbon atoms, which optionally can have one or more COOH groups as a substituent, or an optionally substituted aryl group with 6 to 12 carbon atoms, suitably hydrogen or a methyl, ethyl, n-propyl, iso-propyl, n-butyl, sec-butyl, tert-butyl, n-pentyl or an n-hexyl group. Especially preferred radicals $R^8$ comprise hydrogen, a methyl group and —$CH_2COOH$.

Especially preferred structural units of Formula (3) are derived from straight-chain or branched olefins with 2 to 18 carbon atoms, (meth)acrylamides and/or ethylenesulfonic acid. In this case, olefins, especially those with a terminal C—C double bond, which preferably have 2 to 6 carbon atoms, especially ethylene, have proven quite especially advantageous. In addition, structural units (3) that are derived from acrylamidopropenylsulfonic acid (AMPS) lead to quite especially advantageous results according to the invention.

Especially preferred structural units of formula (4) are derived from (meth)acrylic acid, maleic acid, maleic acid anhydride, fumaric acid and/or itaconic acid.

The total number of structural units of formula (2) is preferably in the range of 0.1 to 40 mol %, suitably in the range of 0.5 to 25.0 mol %, especially in the range of 1.0 to 15.0 mol %, in each case relative to the total number of structural units of formulas (1) and (2). In this case, according to a first preferred embodiment of this invention, a polymer (A1) is used, which contains 1.0 to 2.0 mol % structural units of formula (2) relative to the total number of structural units of formulas (1) and (2). According to a second preferred embodiment of this invention, a polymer (A1) is used, which contains 3.0 to 7.0 mol % structural units of formula (2) relative to the total number of structural units of formulas (1) and (2). According to a third preferred embodiment of this invention, a polymer (A1) is used, which contains 10.0 to 15.0 mol % structural units of formula (2) relative to the total number of structural units of formulas (1) and (2).

According to another especially preferred embodiment of this invention, polymer (A1), in each case relative to its own total weight, contains >50.0% by weight, suitably >60.0% by weight, advantageously >70.0% by weight, especially >80.0% by weight of structural units of formula (1) and/or (2). In this case, especially advantageous results can be achieved with polymers (A1) that, in each case relative to their total weight, contain >85.0% by weight, suitably >90.0% by weight, advantageously >95.0% by weight, especially >99.0% by weight of structural units of formula (1) and/or (2).

Within the scope of this irnvention, polymer (A1) can have a syndiotactic, isotactic and/or ataxic chain synthesis. In addition, it can be present both as a random copolymer and as a block copolymer.

The viscosity of polymer (A1) according to the invention is of lesser importance; in principle both low-molecular and high-molecular polymers (A1) can be used. Nevertheless, it has proven quite especially advantageous within the scope of this invention that the polymer (A1) has a viscosity in the range of 1 to 70 mPas, preferably in the range of 2 to 40 mPas, especially in the range of 3 to 30 mPas (measured as 4% by weight of aqueous solution according to Höppler at 20° C., DIN 53015).

In addition, with respect to their molecular weight, polymers (A1) are not subject to any special limitations; for the purposes of this invention, however, polymers (A1) with a weight average of the molecular weight of at least 20,000 g/mol have proven quite especially effective. In this case, the weight average of the molecular weight is preferably determined by means of gel permeation chromatography, suitably with use of a polyethylene oxide calibration.

The production of polymers (A1) that are to be used according to the invention can be carried out in a way that is known in the art in a two-stage process. In a first step, the corresponding vinyl ester is radically polymerized in a suitable solvent, generally water or an alcohol, such as methanol, ethanol, propanol and/or butanol, with use of a suitable radical starter. If the polymerization is performed in the presence of radically copolymerizable monomers, the corresponding vinyl ester copolymers are obtained.

The vinyl ester (co)polymer is then saponified in a second step, usually by re-esterification with methanol, whereby the degree of saponification can be specifically adjusted in a way that is known in the art, for example by variation of the catalyst concentration, the reaction temperature and/or the reaction time. For additional details, reference is made to the usual technical literature, in particular to Ullmann's Encyclopedia of Industrial Chemistry, Fifth Edition on CD-Rom Wiley-VCH, 1997, Keyword: Poly(Vinyl Acetals) and the bibliographic references that are indicated there.

Within the scope of this invention, the cross-linked polyvinyl acetals are obtained by, in any sequence,
(i) Polymer (A1) being reacted with at least one polyaldehyde of formula (5)

$$R^9(CHO)_n \qquad (5)$$

and
(ii) Groups of formula (1) and formula (4) being at least partially esterified with one another.

In this case, $R^9$ refers to a bond or a radical that has 1 to 40 carbon atoms, preferably an aliphatic, cycloaliphatic and/or aromatic group with suitably 1 to 20, preferably 1 to 12, especially 2 to 10, carbon atoms.

Index n is an integer that is greater than or equal to 2, preferably in the range of 2 to 10, suitably in the range of 2 to 6, especially 2 or 3. According to a quite especially preferred embodiment of this invention, n is equal to 2.

According to the invention, quite especially suitable compounds of formula (5) comprise glyoxyl, propanedial, n-butanedial, glutaric dialdehyde, n-hexanedial, n-heptanedial, n-octanedial, n-nonadial, n-decanedial, n-undecanedial, n-dodecanedial, 4,4'-ethylenedioxydibenzaldehyde and 2-hydroxyhexanedial, especially glutaric dialdehyde and n-nonanedial.

In principle, the amount of polyaldehyde (5) can be selected arbitrarily within the scope of this invention, but it has quite especially proven its value in being used for the purposes of this invention relative to the total weight of polymer (A1), 0.001 to 1.0% by weight, suitably 0.005 to 2.0% by weight, especially 0.01 to 1.0% by weight, of polyaldehyde (5).

Performing steps (i) and (ii) can be done in any sequence, i.e., it is possible to perform first step (i) and then step (ii) or first step (ii) and then step (i) or else also both steps simultaneously. It has proven quite especially advantageous for the purposes of this invention, however, to perform first step (i) and then step (ii).

Within the scope of a quite especially preferred embodiment of this invention, in addition at least one compound of formula (6)

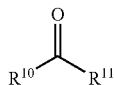

can be added at any time.

In each case independently of one another, radicals $R^{10}$ and $R^{11}$ are hydrogen, an alkyl group with 1 to 10 carbon atoms or an aryl group with 6 to 12 carbon atoms. In this case, these alkyl and aryl radicals can be substituted with one or more hydroxyl, sulfonic acid groups and/or halogen atoms, such as fluorine, chlorine, bromine, or iodine. The preferred compounds of formula (6) include formaldehyde, acetaldehyde, propionaldehyde, n-butyraldehyde, iso-butyraldehyde, 2-ethoxybutyraldehyde, paraldehyde, 1,3,5-trioxane, capronic aldehyde, 2-ethylhexanal, pelargonic aldehyde, 3,5,5-trimethylhexanal, 2-formyl-benzoic sulfonic acid, acetone, ethyl methyl ketone, butyl ethyl ketone and/or ethyl hexyl ketone.

Within the scope of this invention, the use of aldehydes, i.e., of compounds of formula (6) with $R^{10}$=hydrogen and $R^{11}$=hydrogen, a methyl, ethyl, n-propyl or an iso-propyl group, preferably formaldehyde and/or n-butyraldehyde, especially n-butyraldehyde, has quite especially proven its value.

The ratio of components (5) and (6) is preferably selected as follows:

(1) 95.00 to 99.99 parts by weight of at least one compound (6)

(2) 0.01 to 5.00 parts by weight of at least one polyaldehyde (5), and the indicated parts by weight preferably are supplemented up to 100.00 parts by weight.

The reaction of polymer (A1) with compound (5) and/or (6) is preferably carried out in at least one inert solvent, whereby the term "inert solvent" stands for those solvents that do not disrupt or do not at all prevent the sequence of the desired reaction under the respective reaction conditions. An especially suitable solvent in this connection is water.

In addition, the reaction advantageously is performed in the presence of acid catalysts. Suitable acids comprise both organic acids, such as, for example, acetic acid, and mineral acids, such as hydrochloric acid, sulfuric acid and/or nitric acid, whereby the use of hydrochloric acid, sulfuric acid and/or nitric acid has especially proven its value in technology. The performance of the reaction is preferably carried out such that polymer (A1) is present in aqueous solution, compound (5) and/or (6) are introduced into this solution, and then the acid catalyst is added in drops.

Esterification (ii) can be carried out in a way that is known in the art, whereby it has proven quite especially advantageous within the scope of this invention, however, to perform the cross-linking thermally, optionally in the presence of at least one softener, at mass temperatures in the range of 80 to 280° C., preferably in the range of 120 to 280° C., especially in the range of 140 to 260° C.

In this case, the thermal cross-linking of the polyvinyl acetal can be performed with all heatable aggregates that are known to one skilled in the art, such as, e.g., kilns, kneaders, extruders, presses or autoclaves. The thermal cross-linking, however, preferably takes place in extruders or in kneading aggregates, since the latter ensure good homogenization with softener(s), which is (are) contained in a preferred embodiment. The cross-linking can be detected here in the molecular weight of the cross-linked polyvinyl acetal that is higher in comparison to the un-cross-linked polyvinyl acetal.

The degree of cross-linking can—depending on the application—be freely selected. Nevertheless, within the scope of this invention, it has proven quite especially suitable that at least 10 mol %, preferably at least 20 mol %, suitably at least 30 mol %, especially at least 40 mol %, of all carboxyl groups originally contained in the polyvinyl acetal are esterified. In this case, the content of carboxyl groups, relative to the total weight of the cross-linked polyvinyl acetal, is preferably less than or equal to 10.0% by weight and is preferably in the range of 0.00001 to 10.0% by weight, especially preferably in the range of 0.001 to 10.0% by weight, suitably in the range of 0.01 to 5.0% by weight, and especially in the range of 0.01 to 2.0% by weight.

The cross-linked polyvinyl acetals according to the invention contain softeners in a preferred embodiment. As softeners, all softeners that are known to one skilled in the art can be used in this case. In this case, the softener is used in usual amounts that are known to one skilled in the art. Known softeners for polyvinyl acetals, in particular for polyvinyl butyrals, are in this case the esters of aliphatic monocarboxylic acids and dicarboxylic acids with monovalent or multivalent alcohols or oligoalkylene-glycol ethers, phosphoric acid esters as well as different phthalates, as they are disclosed in, for example, U.S. Pat. No. 5,137,954. The diesters of di-, tri- and tetraethylene glycols are preferably used, however, with aliphatic monocarboxylic acids, adipic acid-dialkyl esters as well as the dibenzoates of alkylene and polyalkylene glycols that are described in the non-prepublished DE-A-101 00 681.

Possible uses of the cross-linked polyvinyl acetals according to the invention are obvious to one skilled in the art. They are suitable in particular for all applications that are designed for cross-linked polyvinyl acetals, in particular for polyvinyl formals and/or polyvinyl butyrals. Especially preferred applications comprise their use as films, especially for laminated glasses, which preferably can be produced by direct extrusion with the help of flat-sheet dies. Additional details on the extrusion of polyvinyl acetals and for the production of polyvinyl acetal films, especially of polyvinyl butyral films, are sufficiently known to one skilled in the art from technical literature.

An especially preferred application of the polyvinyl acetals according to the invention within the scope of this invention are fabrics, especially films, preferably with a thickness in the range of 0.5 μm to 1 mm. In this case, the films according to the invention can contain other common additives, such as, e.g., oxidation stabilizers, UV stabilizers, dyes, fillers, pigments and/or antiblocking agents.

Moreover, the polyvinyl acetals according to the invention are also especially suitable for the coating of substrates, especially wood, metal, plastic, glass, textiles, paper, leather as well as ceramic and mineral undersurfaces. Subjects of this invention are therefore also coatings that contain the polyvinyl acetals according to the invention.

In addition, the coatings can contain polymer resins, softeners, pigments, fillers, stabilizers, adhesion aids, rheological adjuvants, additives that influence pH and/or additives that catalyze chemical reactions both between the polyvinyl acetal according to the invention and other polymer resins as well as between the other polymer resins from one to another.

The coating according to the invention can be carried out in a way that is known in the art both as powder, which then is preferably melted and cross-linked at elevated temperature, and from preferably organic solution by means of the coating process that is known to one skilled in the art. In this case, when applied from a solution, preferably the polyvinyl acetal that is to be cross-linked according to the invention, optionally together with additional binders as well as optionally other components, such as, for example, softeners, pigments, fillers, stabilizers, adhesion aids, or rheological adjuvants, is dissolved in solvent or a solvent mixture and then is applied to the substrate that is to be coated. The cross-linking according to the invention is preferably carried out after the solvent is evaporated, suitably at a temperature in the range of 20 to 200° C. In this case, the cross-linking reaction is advantageously supported by pH-lowering additives, such as, for example, organic and/or inorganic acids.

When used in coatings, the cross-linking manifests itself as an increase of the solvent resistance of the coating, as well as in the form of an increase in the molecular weight in comparison to un-cross-linked polyvinyl acetal.

According to another aspect of this invention, the polyvinyl acetals according to the invention are especially also suitable for the production of ion-conductive intermediate layers for electrochromic systems.

The invention claimed is:

1. A process for the production of cross-linked polyvinyl acetals, wherein a polymer (A1) is cross-linked, and polymer (A1) contains, relative to its total weight, a) 1.0 to 99.9% by weight of structural units of formula (1)

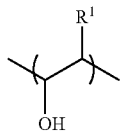

(1)

in which $R^1$ means hydrogen or methyl, b) 0 to 99.0% by weight of structural units of formula (2)

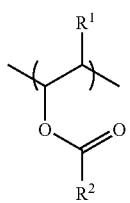

(2)

in which $R^2$ represents hydrogen or an alkyl with 1 to 6 carbon atoms, c) 0 to 70.0% by weight of structural units of formula (3)

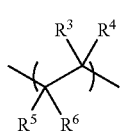

(3)

in which $R^3$, $R^4$, $R^5$ and $R^6$, in each case independently of one another, are each radicals with a molecular weight in the range of 1 to 500 g/mol, d) 0.00001 to 30.0% by weight of structural units of formula (4)

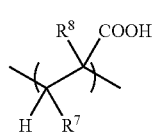

(4)

in which $R^7$ and $R^8$, in each case independently of one another, are hydrogen, carboxy, alkyl group with 1 to 10 carbon atoms which is optionally substituted by one or more COOH groups, or an optionally substituted aryl group with 6 to 12 carbon atoms, said process comprising in any sequence:

(i) reacting polymer (A1) with at least one polyaldehyde of formula (5),

$R^9(CHO)_n$ (5)

in which $R^9$ represents a bond or a radical having 1 to 40 carbon atoms, and n is an integer that is greater than or equal to 2, and (ii) partially esterifying groups of formula (1) and formula (4) with one another.

2. A process according to claim 1, wherein n is 2 or 3.

3. A process according to claim 1, wherein $R^9$ is an aliphatic, cycloaliphatic and/or aromatic group with 1 to 12 carbon atoms.

4. A process according to claim 1, wherein glutaric dialdehyde and/or n-nonanedial is used as compound of formula (5).

5. A process according to claim 1, further comprising, at any time during the process, adding at least one compound of formula (6),

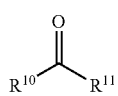

(6)

in which $R^{10}$ and $R^{11}$, in each case independently of one another, are hydrogen, alkyl with 1 to 10 carbon atoms or an optionally substituted aryl group with 6 to 12 carbon atoms.

6. A process according to claim 5, wherein said compound of formula (6) is n-butyraldehyde.

7. A process according to claim 5, wherein the compounds of formulas 5 and 6 are used in the following ratio:

(1) 95.00 to 99.99 parts by weight of at least one compound of formula (6)

(2) 0.01 to 5.00 parts by weight of at least one polyaldehyde of formula (5).

8. A process according to claim 1, wherein the esterification of (ii), optionally in the presence of at least one softener, is performed at a temperature in the range of 80 to 280° C.

9. A process according to claim 8, wherein cross-linking is performed in an extruder, a kneading aggregate or another heatable aggregate.

10. A cross-linked polyvinyl acetal that can be obtained by a process according to claim 1.

11. A cross-linked polyvinyl acetal according to claim 10, wherein said cross-linked polyvinyl has a total content of esterified and non-esterified carboxyl groups of less than or equal to 10.0% by weight, relative to the total weight of the polyvinyl acetal.

12. A cross-linked polyvinyl acetal according to claim 10, wherein said cross-linked polyvinyl acetal contains a softener.

13. A molding compound comprising a polyvinyl acetal according to claim 10.

14. A film comprising a polyvinyl acetal according to claim 10.

15. In a laminated safety glass article, the improvement wherein said article comprises a film according to claim 14.

16. In a coating composition, the improvement wherein said coating composition comprises a polyvinyl acetal according to claim 10.

17. In an electronic system having at least one ion-conductive intermediate layer, the improvement wherein a polyvinyl acetal according to claim 10 is used as an ion-conductive intermediate layer.

* * * * *

UNITED STATES PATENT AND TRADEMARK OFFICE
CERTIFICATE OF CORRECTION

PATENT NO. : 7,528,192 B2
APPLICATION NO. : 10/542022
DATED : May 5, 2009
INVENTOR(S) : Bernd Papenfuhs et al.

It is certified that error appears in the above-identified patent and that said Letters Patent is hereby corrected as shown below:

Column 10, line 13, reads "hydrogen, carboxy," should read --hydrogen, carboxyl,--

Column 10, line 45, reads "10 carbon atoms or an" should read --10 carbon atoms, or an--

Signed and Sealed this

Sixteenth Day of November, 2010

David J. Kappos
*Director of the United States Patent and Trademark Office*